United States Patent
Ozaki et al.

(10) Patent No.: US 9,634,324 B2
(45) Date of Patent: Apr. 25, 2017

(54) NICKEL-METAL HYDRIDE BATTERY AND METHOD FOR PRODUCING HYDROGEN STORAGE ALLOY

(75) Inventors: Tetsuya Ozaki, Kyoto (JP); Manabu Kanemoto, Kyoto (JP); Masaharu Watada, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 1281 days.

(21) Appl. No.: 12/734,496

(22) PCT Filed: Sep. 18, 2008

(86) PCT No.: PCT/JP2008/066891
§ 371 (c)(1),
(2), (4) Date: May 5, 2010

(87) PCT Pub. No.: WO2009/060666
PCT Pub. Date: May 14, 2009

(65) Prior Publication Data
US 2010/0239906 A1   Sep. 23, 2010

(30) Foreign Application Priority Data
Nov. 9, 2007   (JP) .................. 2007-291873

(51) Int. Cl.
*H01M 4/38*    (2006.01)
*C22C 19/03*   (2006.01)
(Continued)

(52) U.S. Cl.
CPC ............ *H01M 4/383* (2013.01); *C22C 19/03* (2013.01); *C22C 19/05* (2013.01); *C22F 1/10* (2013.01);
(Continued)

(58) Field of Classification Search
None
See application file for complete search history.

(56) References Cited

U.S. PATENT DOCUMENTS 6,214,492 B1 * 4/2001 Kono et al. ................. 429/218.2
2001/0041292 A1   11/2001 Hayashida et al.
(Continued)

FOREIGN PATENT DOCUMENTS

EP    0892451 A2    1/1999
JP    11-323469    * 11/1999 ............ C22C 19/00
(Continued)

OTHER PUBLICATIONS

English translation of JP 11-323469 (1999).*
(Continued)

*Primary Examiner* — Yoshitoshi Takeuchi
(74) *Attorney, Agent, or Firm* — Michael Best & Friedrich LLP

(57) ABSTRACT

It is an object of the present invention to improve the cycle performance in a nickel-metal hydride battery using a rare earth-Mg—Ni type alloy. The present invention provides a nickel-metal hydride battery having a negative electrode including an La—Mg—Ni based hydrogen absorbing alloy, wherein the hydrogen absorbing alloy has a crystal phase having $Gd_2Co_7$ type crystal structure and contains calcium.

2 Claims, 3 Drawing Sheets

(51) Int. Cl.
*C22C 19/05* (2006.01)
*C22F 1/10* (2006.01)
*H01M 10/34* (2006.01)

(52) U.S. Cl.
CPC .......... *H01M 4/385* (2013.01); *H01M 10/345* (2013.01)

(56) References Cited

U.S. PATENT DOCUMENTS

2006/0254678 A1 11/2006 Sakai et al.
2009/0130551 A1* 5/2009 Mori et al. .................... 429/174
2009/0148770 A1* 6/2009 Ozaki et al. ................ 429/218.2

FOREIGN PATENT DOCUMENTS

| JP | 11-323469 A | 11/1999 | | |
|---|---|---|---|---|
| JP | 2002-105564 A | 4/2002 | | |
| JP | WO2007/004703 | * | 1/2007 | ............. H01M 4/24 |
| JP | WO2007/023901 | * | 3/2007 | ............. C22C 19/00 |
| WO | WO-2007/018291 A1 | 2/2007 | | |
| WO | WO-2007/018292 A1 | 2/2007 | | |
| WO | WO-2007/023901 A1 | 3/2007 | | |

OTHER PUBLICATIONS

Office Action issued in Chinese Application No. 2012061800914910, dated Jun. 21, 2012.
Extended European Search Report issued in EP Application No. 08847279.0, dated Dec. 15, 2011.
Zhang Peng et al., "*Effect of Ca on the microstructural and electrochemical properties of* $La_{2.3-x}Ca_xMg_{0.7}Ni_9$ *hydrogen storage alloys*," Electrochimica Acta, vol. 51, pp. 6400-6405 (2006) (Abstract only).
International Search Report mailed on Dec. 22, 2008.
Kanemoto et al., "Development of New Rare-Earth-Mg-Ni-Based Hydrogen Storage Alloys with High Capacity," GS Yuasa Tech Rep (Web), vol. 3, No. 1, pp. 20-25, 2006. (partial translation enclosed).
Office Action in Japanese Patent Application No. 2009-539987, dated Jul. 23, 2013.

* cited by examiner

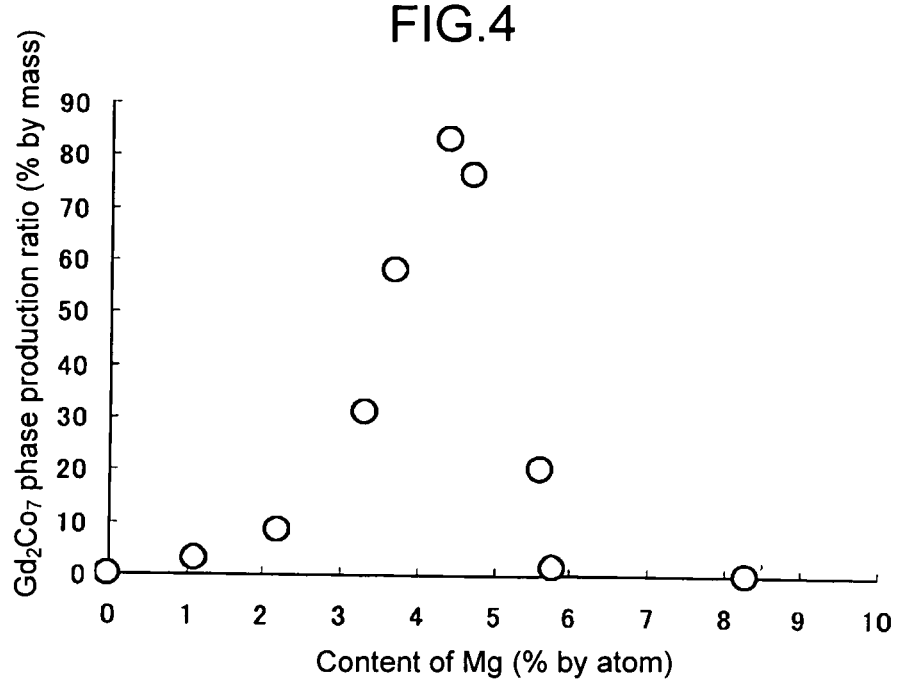

NICKEL-METAL HYDRIDE BATTERY AND METHOD FOR PRODUCING HYDROGEN STORAGE ALLOY

FIELD OF THE ART

The present invention relates to a nickel-metal hydride battery using a hydrogen absorbing alloy as a negative electrode material and a method of producing a hydrogen absorbing alloy.

PRIOR ART

A nickel-metal hydride battery using a hydrogen absorbing alloy as a negative electrode material has features such as (a) having a high capacity, (b) durable for overcharge and overdischarge, (c) capable of highly efficient charge-discharge and (d) clean, and thus has been used for various uses.

As a negative electrode material of such a nickel-metal hydride battery, an $AB_5$ based rare earth-nickel based alloy exhibiting excellent cycle performance and having a $CaCu_5$ type crystal structure has been put into practical use. However, in a case, where the $AB_5$ based rare earth-nickel based alloy is used as an electrode material, the discharge capacity has an upper limit of about 300 mAh/g and further improvement of the discharge capacity using the alloy has become difficult in the present situation.

On the other hand, as a new hydrogen absorbing alloy, a rare earth-Mg—Ni based alloy (in this specification, also referred to as La—Mg—Ni based alloy) has drawn attention, and it has been reported that use of such a rare earth-Mg—Ni based alloy as an electrode material gives a discharge capacity exceeding that of an $AB_5$ based alloy (Patent Document 1 or the like).

However, a conventional nickel-metal hydride battery using a rare earth-Mg—Ni based alloy has a problem that the hydrogen absorbing capacity of the alloy tends to be lowered in the case of repeating hydrogen absorption and desorption (that is, charge and discharge) and thus the cycle performance is inferior as compared with a case where the $AB_5$ based rare earth-Ni based alloy is used as an electrode material.

In order to solve the problem, the following Non-Patent Document 1 describes an attempt of improving the cycle performance of a nickel-metal hydride battery using a rare earth-Mg—Ni based alloy obtained by adding calcium to the rare earth-Mg—Ni based alloy.

Patent Document 1: JP-A No. Hei 11-323469
Non-Patent Document 1: Electrochimica Acta 51 (2006) 6400-6405

DISCLOSURE OF THE INVENTION

Problems to Be Solved by the Invention

According to the results of the investigations that the present inventors have made, it has been found that sufficiently improving the cycle performance is not necessarily exhibited by only adding calcium to a rare earth-Mg—Ni based alloy and that effects are significantly uneven depending on the composition of a crystal phase, or the like.

In view of the above-mentioned problems of the prior art, an object of the present invention is to improve the cycle performance of a nickel-metal hydride battery using a rare earth-Mg—Ni based alloy.

Means for Solving the Problems

The present inventors have made various investigations to solve the problems and consequently have found that including a crystal phase having $Gd_2Co_7$ type crystal structure among rare earth-Mg—Ni based alloys can exhibit the effect to improve excellent cycle performance by calcium addition and the finding has now led to completion of the invention.

That is, the invention provides a nickel-metal hydride battery having a negative electrode including an La—Mg—Ni based hydrogen absorbing alloy, wherein the hydrogen absorbing alloy has a crystal phase having $Gd_2Co_7$ type crystal structure and contains calcium.

The present invention preferably provides the nickel-metal hydride battery, wherein the hydrogen absorbing alloy contains 3% by mass of the crystal phase having $Gd_2Co_7$ type crystal structure and further preferably provides the nickel-metal hydride battery, wherein the content of the calcium in the hydrogen absorbing alloy is 0.7% by atom or higher and 9.5% by atom or lower and the nickel-metal hydride battery, wherein the content of magnesium in the hydrogen absorbing alloy is 1.1% by atom or higher and 5.6% by atom or lower.

Moreover, the present invention preferably provides the above-mentioned nickel-metal hydride battery, wherein the hydrogen absorbing alloy has a layered structure of a plurality of crystal phases layered in the c-axis direction of the crystal structure.

Further, the present invention provides a method of producing a hydrogen absorbing alloy involving a melting step of melting raw materials containing at least rare earth elements, magnesium, calcium, and nickel and blended to adjust the content of calcium to 0.7% by atom or higher and 9.5% by atom or lower and the content of magnesium to 1.1% by atom or higher and 5.6% by atom or lower after melting, a cooling step of quenching the melted raw materials, and an annealing step of annealing the cooled alloy under pressurized atmosphere.

In the present invention, the La—Mg—Ni based hydrogen absorbing alloy means an alloy containing rare earth elements, Mg and Ni and having the number of nickel atoms more than 3 times and less than 5 times as much as the total number of rare earth elements, Mg atoms, and Ca atoms added according to the present invention. Particularly, as an alloy having a layered structure of a plurality of crystal phases layered in the c-axis direction of the crystal structure, an alloy represented by the following general formula (1) is preferably used:

$$R1_vCa_wMg_xNi_yR2_z \qquad (1)$$

(wherein, R1 is one or more elements selected from the group consisting of Y and rare earth elements; R2 is one or more elements selected from the group consisting of Co, Cu, Mn, Al, Cr, Fe, Zn, V, Nb, Ta, Ti, Zr, and Hf; and v, w, x, y, and z are numerals satisfying $8.9 \leq v \leq 14$, $3.3 \leq w \leq 8.9$, $3.3 \leq x \leq 5.6$, $73.3 \leq y \leq 78.7$, $0 \leq z \leq 4.4$, and $v+w+x+y+z=100$, respectively).

Further, in the present invention, % by atom means percentage of the number of a specified atom based on the total number of existing atoms. Consequently, an alloy containing 1% by atom of calcium, for example, means an alloy containing 1 calcium atom in 100 atoms of alloy.

The nickel-metal hydride battery of the present invention is provided with an effect of keeping an excellent discharge capacity, which is a characteristic of an La—Mg—Ni based hydrogen absorbing alloy and at the same time considerably improving the cycle performance.

It is supposedly attributed to the following function. That is, in an La—Mg—Ni based hydrogen absorbing alloy composed of $A_2B_4$ units and $AB_5$ units, Mg forming a solid solution in the $A_2B_4$ units has significant difference in the atomic radius from rare earth elements or the like, and the lattice lengths of the $A_2B_4$ units and $AB_5$ units become uneven, so that Mg tends to be precipitated and it is supposed that Mg precipitation could result in cracking of the alloy by repeated expansion and contraction of the alloy due to absorption and desorption of hydrogen to lead to deterioration. It is supposedly attributed to that Ca added according to the present invention has relatively narrow difference in the atomic radius from rare earth elements or the like, and the Ca mainly forms a solid solution in the $A_2B_4$ units to moderate the unevenness of the lattice lengths of the $A_2B_4$ units and the $AB_5$ units and moreover such an effect is exhibited more significantly on a crystal phase having $Gd_2Co_7$ type crystal structure in which the $A_2B_4$ units and $AB_5$ units exist at a prescribed ratio.

Effects of the Invention

As described above, according to the present invention, the cycle performance can be improved in the nickel-metal hydride battery using a rare earth-Mg—Ni based alloy.

BRIEF DESCRIPTION OF THE DRAWINGS

FIG. 4: A graph formed by plotting results of Examples and Comparative Examples, showing the content of Ca in the abscissa axis and the content of $Gd_2Co_7$ phase in the ordinate axis.

BEST MODE FOR CARRYING OUT THE INVENTION

The nickel-metal hydride battery of the present invention is a nickel-metal hydride battery having a negative electrode including an La—Mg—Ni type hydrogen absorbing alloy, wherein the hydrogen absorbing alloy has a crystal phase having $Gd_2Co_7$ type crystal structure (hereinafter, simply referred to also as $Gd_2Co_7$ phase) and contains calcium.

Figure 1:
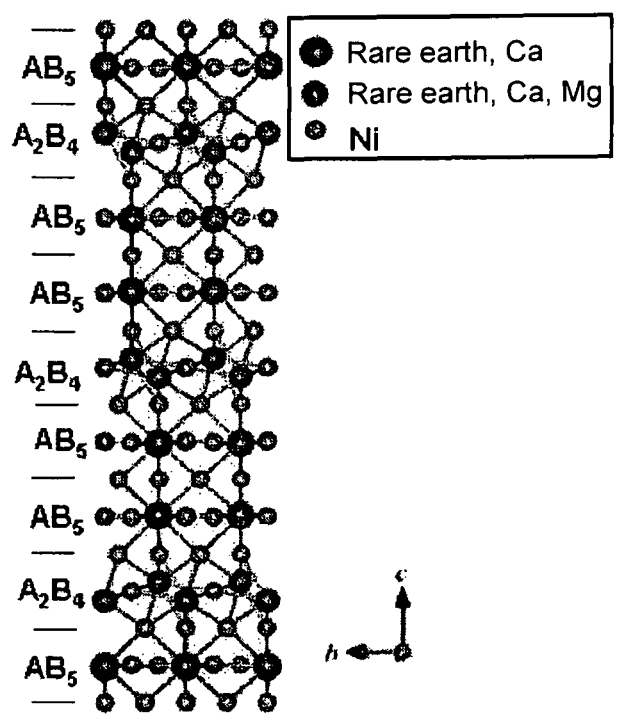
FIG. 1: A drawing showing $Gd_2Co_7$ type crystal structure.

The $Gd_2Co_7$ type crystal structure is, as shown in FIG. 1, a crystal structure formed by inserting 2 units of $AB_5$ unit between $A_2B_4$ units and belongs to a rhombohedral crystal system and has a R-3m space group.

Herein, the $A_2B_4$ unit is a crystal lattice having a hexagonal $MgZn_2$ type crystal structure (C14 structure) or a hexagonal $MgCu_2$ type crystal structure (C15 structure) and the $AB_5$ units is a crystal lattice having a hexagonal $CaCu_5$ type crystal structure.

Further, in general, A represents any element selected from the group consisting of rare earth elements and Mg and B represents any element selected from the group consisting of transition metal elements and Al.

The content of the $Gd_2Co_7$ phase is preferably 3% by mass or higher, more preferably 5% by mass or higher, even preferably 20% by mass or higher, and particularly more preferably 70% by mass or higher in the hydrogen absorbing alloy.

The cycle performance of the nickel-metal hydride battery can be further improved by adjusting the content of the crystal phase having $Gd_2Co_7$ type crystal structure to the above range.

The hydrogen absorbing alloy may also have, as another crystal phase, a crystal phase having a hexagonal $Pr_5Co_{19}$ type crystal structure (hereinafter, simply referred to also as $Pr_5Co_{19}$ phase), a crystal phase having a rhombohedral $Ce_5Co_{19}$ type crystal structure (hereinafter, simply referred to also as $Ce_5Co_{19}$ phase), and a crystal phase having a hexagonal $Ce_2Ni_7$ type crystal structure (hereinafter, simply referred to also as $Ce_2Ni_7$ phase) and may preferably have the $Pr_5Co_{19}$ phase and the $Ce_5Co_{19}$ phase.

Herein, the $Pr_5Co_{19}$ type crystal structure is a crystal structure formed by inserting 3 units of $AB_5$ unit between $A_2B_4$ units; the $Ce_5Co_{19}$ type crystal structure is a crystal structure formed by inserting 3 units of $AB_5$ unit between $A_2B_4$ units; and the $Ce_2Ni_7$ type crystal structure is a crystal structure formed by inserting 2 units of $AB_5$ unit between $A_2B_4$ units.

The crystal structures of the respective crystal phases having the crystal structures can be specified by, for example, carrying out X-ray diffractometry for pulverized alloy powders and analyzing the obtained X-ray diffraction pattern by the Rietveld method.

Further, the content of the calcium contained in the hydrogen absorbing alloy is preferably adjusted to 0.7% by atom or higher and 9.5% by atom or lower, more preferably 1.1% by atom or higher and 4.4% by atom or lower, and particularly preferably 1.1% by atom or higher and 4.3% by atom or lower.

The cycle performance of the nickel-metal hydride battery can be further improved by adjusting the content of the calcium in the hydrogen absorbing alloy in the above range.

Moreover, from the viewpoint of an increase of the content of the crystal phase having $Gd_2Co_7$ type crystal structure, the amount of magnesium to be added is preferably adjusted to 1.1% by atom or higher, more preferably 2.2% by atom or higher, even preferably 3.3% by atom or higher, and particularly preferably 4.0% by atom or higher and from the same viewpoint, it is preferably adjusted to less than 5.8% by atom, more preferably 5.6% by atom or lower, even preferably 5.5% by atom or lower, and particularly preferably 5.0% by atom or lower.

In general, an La—Mg—Ni based hydrogen absorbing alloy means an alloy containing rare earth elements, Mg, and Ni and having the number of Ni atoms more than 3 times and less than 5 times as much as the total number of rare earth elements and Mg atoms; however in the present invention, since Ca is contained, the La—Mg—Ni type hydrogen absorbing alloy is an alloy containing rare earth elements, Mg, and Ni and having the number of Ni atoms more than 3 times and less than 5 times as much as the total number of rare earth elements, Mg atoms, and Ca atoms added according to the present invention.

The composition of the alloy is preferably an alloy represented by the following general formula (1):

$$R1_vCa_wMg_xNi_yR2_z \qquad (1).$$

In the above general formula, R1 is one or more elements selected from the group consisting of Y and rare earth elements and is preferably one or more elements selected from the group consisting of La, Ce, Pr, Nd, Sm, and Y.

R2 is one or more elements selected from the group consisting of Co, Cu, Mn, Al, Cr, Fe, Zn, V, Nb, Ta, Ti, Zr, and Hf and is preferably one or more elements selected from the group consisting of Co and Al.

Further, v, w, x, y, and z are numerals satisfying v+w+x+y+z=100; v is a numeral satisfying $6.7 \leq v-17.9$ and preferably a numeral satisfying $11.3 \leq v \leq 16.7$; w is a numeral satisfying $0.7 \leq w \leq 9.5$ and preferably a numeral satisfying $1.1 \leq w \leq 4.4$; x is a numeral satisfying $1.1 \leq x \leq 5.6$ and preferably a numeral satisfying $3.3 \leq x \leq 5.6$; y is a numeral satisfying $73.3 \leq y \leq 78.7$ and preferably a numeral satisfying $74.4 \leq y \leq 78.3$; and z is a numeral satisfying $0 \leq z \leq 4.4$ and preferably a numeral satisfying $0 \leq z \leq 3.3$.

Particularly, in the present invention, an alloy satisfying $3.3 \leq (y+z)/(v+w+z) \leq 3.7$ in the above composition may be more preferably used. Use of the alloy with such composition can provide an effect such that hydrogen can be reversely absorbed and desorbed in around normal temperature and normal pressure and a high hydrogen absorbing capacity can be shown.

Further, in the present invention, the La—Mg—Ni based hydrogen absorbing alloy preferable has a layered structure of a plurality of crystal phases layered in the c-axis direction of the crystal structure. In the alloy with such a structure, the function effect of Ca addition as described above tends to be easily exhibited and the cycle performance of the nickel-metal hydride battery can be furthermore improved.

Next, a method of producing the nickel-metal hydride battery of the present invention will be described.

A method of producing a hydrogen absorbing alloy as one embodiment involves a melting step of melting alloy raw materials blended to give the prescribed composition ratio, a cooling step of quenching and solidifying the melted raw materials at a cooling rate of 1000 K/s or higher, and an annealing step of annealing the cooled alloy under inert gas atmosphere in pressurized state at the temperature of 860° C. or higher and 1000° C. or lower.

The respective steps will be specifically described and first, prescribed amounts of raw material ingots (alloy raw materials) are weighed based on the chemical composition of an aimed hydrogen absorbing alloy.

In the melting step, the alloy raw materials are put in a crucible and heated at, for example, 1200° C. or higher and 1600° C. or lower under inert gas atmosphere or in vacuum by using a high frequency melting furnace to melt the alloy raw materials.

In the cooling step, the melted alloy raw materials are cooled and solidified. The cooling rate is preferably 1000 K/s or higher (also called as quenching). Quenching at 1000 K/s or higher is effective to make the alloy composition very fine and homogeneous. Further, the cooling rate may be set in a range of 1000000 K/s or lower.

Further, in the cooling step, as the cooling rate becomes faster, the amount of CaCu$_5$ phase to be produced in the solidified alloy is lessened and if the rate exceeds a certain rate, it tends to be constant. Since the discharge capacity is improved by lessening the amount of the CaCu$_5$ phase to be produced, it is preferable to adjust the cooling rate capable of lessening the amount of the CaCu$_5$ phase to be produced as described above, and particularly, it is preferable to adjust the cooling rate to the rate at which the amount to be produced tends to be constant.

From such a viewpoint, as the cooling method, those so-called quenching, specifically, a melt spinning method or a gas atomization method may be employed, and particularly, a melt spinning method at a cooling rate of 100000 K/s or higher and a gas atomization method at a cooling rate of 10000 K/s are more preferably employed.

In the annealing step, under inert gas atmosphere in pressurized state, heating to 860° C. or higher and 1000° C. or lower is carried out by using, for example, an electric furnace or the like. The pressurizing condition may be preferably 0.2 MPa (gauge pressure) or higher and 1.0 MPa (gauge pressure) or lower. The treatment time in the annealing step is preferably adjusted to 3 hours or longer and 50 hours or shorter.

The hydrogen absorbing alloy obtained in such a manner tends to have a layered structure of a plurality of crystal phases layered in the c-axis direction of the crystal structure and particularly, use of the above alloy raw materials makes it possible to give the hydrogen absorbing alloy which tends to have a crystal phase having Gd$_2$Co$_7$ type crystal structure.

The hydrogen absorbing alloy electrode of the present invention has, for example, the hydrogen absorbing alloy produced as described above as a hydrogen absorbing medium. At the time of using the hydrogen absorbing alloy as a hydrogen absorbing medium for an electrode, the hydrogen absorbing alloy is preferably used after pulverization.

Pulverization of the hydrogen absorbing alloy at the time of electrode production may be carried out either before or after the annealing. However, since the surface area becomes large by pulverization, it is preferable to carry out pulverization after annealing from the viewpoint of prevention of surface oxidation of the alloy. The pulverization is preferably carried out under inert atmosphere in order to prevent oxidation of the alloy surface.

For the pulverization, for example, mechanical pulverization or hydrogenation pulverization may be employed.

The hydrogen absorbing alloy electrode can be produced by mixing the hydrogen absorbing alloy powders obtained in the above-mentioned manner with a binder such as a resin composition or a rubber composition and pressure-molding the obtained mixture in a prescribed shape. The nickel-metal hydride battery of the present invention can be produced by using the hydrogen absorbing alloy electrode as a negative electrode and an electrode made of nickel hydroxide separately produced as a positive electrode and packing an aqueous potassium hydroxide solution as an electrolyte solution.

EXAMPLES

Hereinafter, the present invention will be more specifically described with reference to Examples and Comparative Examples. However, the present invention should not be limited to the following Examples.

Example 1

Production of La—Mg—Ni Type Hydrogen Absorbing Alloy

Prescribed amounts of raw material ingots to give chemical composition of La$_{17.9}$Ca$_{0.7}$Mg$_{4.7}$Ni$_{76.7}$ were weighed and the raw materials were put in a crucible and heated to 1500° C. under argon atmosphere in reduced pressure by using a high frequency melting furnace to melt the materials. After the melting, quenching was carried out by employing a melt spinning method to solidify an alloy.

Next, after heated at 910° C. under argon atmosphere pressurized to 0.2 MPa (gauge pressure, the same applies hereinafter), the obtained hydrogen absorbing alloy was pulverized to obtain a hydrogen absorbing alloy powder with an average particle diameter (D50) of 20 μm.

Measurement of Crystal Structure and Calculation of Existence Ratio

The obtained hydrogen absorbing alloy powder was subjected to a measurement under the condition of 40 kV and 100 mA (Cu bulb) by using an X-ray diffraction apparatus (manufactured by Bruker AXS, product number M06XCE). Further, analysis by Rietveld method (analysis soft: RIETAN2000) was carried out for structure analysis and the ratio of the crystal phases produced in each hydrogen absorbing alloy was calculated. The results are shown in Table 2.

Measurement of Capacity Retention Ratio of Nickel-Metal Hydride Battery (Opened Type Cell)

1) Production of Electrodes

An opened type nickel-metal hydride battery was produced by using the above-mentioned hydrogen absorbing alloy powder for a negative electrode. Specifically, a paste obtained by adding 3 parts by weight of a nickel powder (manufactured by INCO, #210) to 100 parts by weight of the hydrogen absorbing alloy powder obtained in the above-mentioned manner to be mixed, adding an aqueous solution in which a thickener (methyl cellulose) was dissolved, and further adding 1.5 parts by weight of a binder (styrene butadiene rubber) was applied to both surfaces of a punched steel plate with a thickness of 45 μm (porosity 60%) and dried and thereafter pressed to the thickness of 0.36 mm to obtain a negative electrode. On the other hand, a sintered nickel hydroxide electrode in an excess capacity was employed as a positive electrode.

2) Production of Opened Type Cell

The electrode produced in the above-mentioned manner was sandwiched with the positive electrode through a separator interposed therebetween and these electrodes were fixed with bolts in a manner of applying a pressure of 1 kgf/cm² to the electrodes to assemble an opened type cell.

A mixed solution of a 6.8 mol/L KOH solution and a 0.8 mol/L LiOH solution was used as an electrolyte solution.

3) Evaluation of Capacity Retention Ratio

In a water tank at 20° C., 50 cycles each involving 150% charge at 0.1 ItA and discharge to give a cutoff voltage of 0.6 V (relatively to Hg/HgO) at 0.2 ItA were repeated. The discharge capacity at the 50th cycle to the maximum discharge capacity was calculated as the capacity retention ratio (%).

Examples 2 to 11 and Comparative Examples 1 to 10

Figure 2:
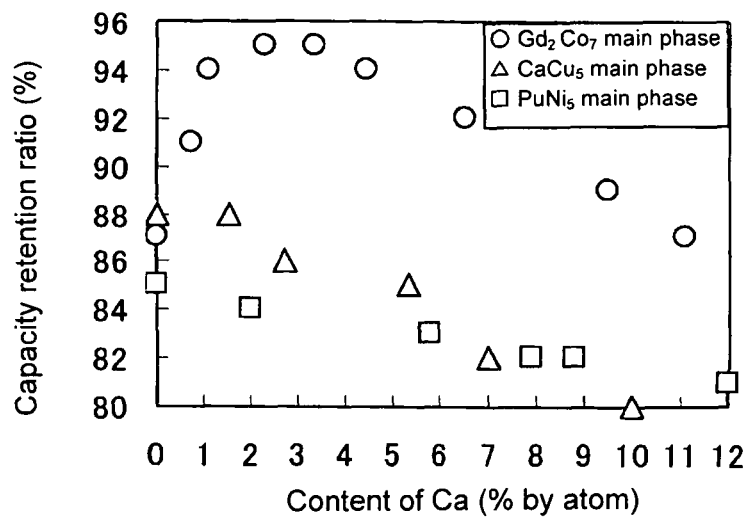
FIG. 2: A graph formed by plotting the results of Examples and Comparative Examples, showing the content of Ca in the abscissa axis and capacity retention ratio in the ordinate axis.

Nickel-metal hydride batteries of the following Examples and Comparative Examples were produced in the same manner as in Example 1, except that hydrogen absorbing alloys with different contents of Ca as shown in the following Table 1 or hydrogen absorbing alloys having different crystal phases were used and similarly, evaluations of the maximum discharge capacity and the capacity retention ratio were carried out. The ratio of the crystal phases of the obtained alloys and the evaluation results of the capacity retention ratio were shown in Table 2 and based on the data obtained from Table 2, a graph formed by plotting the obtained results is shown in FIG. 2, showing the content of Ca in the abscissa axis and capacity retention ratio in the ordinate axis.

TABLE 1

| | Alloy composition (% by atom) | | | | | | | | | | | |
|---|---|---|---|---|---|---|---|---|---|---|---|---|
| | La | Ce | Pr | Nd | Sm | Y | Ca | Mg | Ni | Co | Mn | Al |
| Example 1 | 17.9 | 0.0 | 0.0 | 0.0 | 0.0 | 0.0 | 0.7 | 4.7 | 76.7 | 0.0 | 0.0 | 0.0 |
| Example 2 | 16.7 | 0.0 | 0.0 | 0.0 | 0.0 | 0.0 | 1.1 | 4.4 | 77.8 | 0.0 | 0.0 | 0.0 |
| Example 3 | 16.3 | 0.0 | 0.0 | 0.0 | 0.0 | 0.0 | 2.3 | 4.7 | 76.7 | 0.0 | 0.0 | 0.0 |
| Example 4 | 13.3 | 0.0 | 0.0 | 0.0 | 0.0 | 0.0 | 3.3 | 5.6 | 77.8 | 0.0 | 0.0 | 0.0 |
| Example 5 | 11.1 | 2.2 | 0.0 | 0.0 | 0.0 | 0.0 | 4.3 | 3.7 | 78.7 | 0.0 | 0.0 | 0.0 |
| Example 6 | 10.2 | 0.0 | 1.1 | 0.0 | 0.0 | 0.0 | 6.5 | 4.4 | 74.4 | 0.0 | 0.0 | 3.3 |
| Example 7 | 7.2 | 0.0 | 1.1 | 0.0 | 0.0 | 0.0 | 9.5 | 4.4 | 77.8 | 0.0 | 0.0 | 0.0 |
| Example 8 | 5.6 | 0.0 | 0.0 | 1.1 | 0.0 | 0.0 | 11.1 | 4.4 | 77.8 | 0.0 | 0.0 | 0.0 |
| Example 9 | 9.4 | 0.0 | 0.0 | 0.0 | 4.3 | 0.0 | 1.5 | 4.3 | 76.1 | 0.0 | 0.0 | 4.3 |
| Example 10 | 14.4 | 0.0 | 0.0 | 0.0 | 0.0 | 0.0 | 2.7 | 3.8 | 77.1 | 0.0 | 0.0 | 2.1 |
| Example 11 | 7.9 | 0.0 | 0.0 | 0.0 | 0.0 | 0.0 | 8.8 | 5.8 | 77.5 | 0.0 | 0.0 | 0.0 |
| Comparative Example 1 | 17.8 | 0.0 | 0.0 | 0.0 | 0.0 | 0.0 | 0.0 | 4.4 | 77.8 | 0.0 | 0.0 | 0.0 |
| Comparative Example 2 | 12.5 | 0.0 | 4.2 | 0.0 | 0.0 | 0.0 | 0.0 | 4.2 | 71.9 | 4.2 | 0.0 | 3.1 |
| Comparative Example 3 | 14.3 | 0.0 | 0.0 | 0.0 | 0.0 | 0.0 | 5.3 | 3.4 | 72.4 | 0.0 | 2.3 | 2.3 |
| Comparative Example 4 | 11.6 | 0.0 | 0.0 | 0.0 | 0.0 | 0.0 | 7.0 | 4.7 | 72.1 | 0.0 | 0.0 | 4.7 |
| Comparative Example 5 | 4.2 | 1.0 | 0.7 | 0.8 | 0.0 | 0.0 | 10.0 | 0.0 | 71.7 | 5.0 | 3.3 | 3.4 |
| Comparative Example 6 | 17.5 | 0.0 | 0.0 | 0.0 | 0.0 | 0.0 | 0.0 | 7.5 | 75.0 | 0.0 | 0.0 | 0.0 |
| Comparative Example 7 | 14.3 | 0.0 | 0.0 | 0.0 | 0.0 | 0.0 | 2.0 | 8.3 | 75.4 | 0.0 | 0.0 | 0.0 |
| Comparative Example 8 | 11.8 | 0.0 | 0.0 | 0.0 | 0.0 | 0.0 | 5.8 | 7.5 | 75.0 | 0.0 | 0.0 | 0.0 |
| Comparative Example 9 | 9.6 | 0.0 | 0.0 | 0.0 | 0.0 | 0.0 | 7.9 | 7.5 | 75.0 | 0.0 | 0.0 | 0.0 |
| Comparative Example 10 | 5.5 | 0.0 | 0.0 | 0.0 | 0.0 | 0.0 | 12.0 | 7.5 | 75.0 | 0.0 | 0.0 | 0.0 |

TABLE 2

| | Ratio of crystal phases (% by mass) | | | | | Maximum discharge capacity [mAh/g] | Capacity retention ratio [%] |
|---|---|---|---|---|---|---|---|
| | $Gd_2Co_7$ | $PuNi_3$ | $CaCu_5$ | $Ce_2Ni_7$ | $Ce_5Co_{19}$ | | |
| Example 1 | 58 | 2 | 18 | 23 | 0 | 372 | 91 |
| Example 2 | 55 | 0 | 2 | 0 | 43 | 382 | 94 |
| Example 3 | 80 | 0 | 1 | 0 | 19 | 387 | 95 |
| Example 4 | 76 | 2 | 0 | 0 | 22 | 392 | 95 |
| Example 5 | 58 | 2 | 1 | 0 | 40 | 377 | 95 |
| Example 6 | 35 | 3 | 5 | 11 | 47 | 382 | 92 |
| Example 7 | 48 | 1 | 21 | 28 | 2 | 380 | 89 |
| Example 8 | 45 | 1 | 18 | 36 | 1 | 375 | 87 |
| Example 9 | 2 | 1 | 59 | 32 | 7 | 351 | 88 |
| Example 10 | 1 | 0 | 55 | 41 | 3 | 367 | 86 |
| Example 11 | 2 | 71 | 17 | 1 | 10 | 385 | 82 |
| Comparative Example 1 | 45 | 1 | 17 | 34 | 3 | 360 | 87 |
| Comparative Example 2 | 1 | 5 | 38 | 35 | 21 | 344 | 88 |
| Comparative Example 3 | 0 | 0 | 51 | 39 | 10 | 374 | 85 |
| Comparative Example 4 | 0 | 0 | 48 | 47 | 5 | 382 | 82 |
| Comparative Example 5 | 0 | 0 | 100 | 0 | 0 | 355 | 80 |
| Comparative Example 6 | 0 | 56 | 31 | 0 | 13 | 377 | 85 |
| Comparative Example 7 | 0 | 60 | 27 | 0 | 13 | 381 | 84 |
| Comparative Example 8 | 0 | 62 | 19 | 2 | 17 | 384 | 83 |
| Comparative Example 9 | 0 | 84 | 15 | 1 | 0 | 390 | 82 |
| Comparative Example 10 | 0 | 68 | 29 | 3 | 0 | 389 | 81 |

As a result of measurement of the crystal structure, the hydrogen absorbing alloys obtained in Examples and Comparative Examples (except Comparative Example 5) were found all having a layered structure of a plurality of crystal phases layered in the c-axis direction of the crystal structure.

Further, as shown in Table 2 and FIG. 2, Comparative Examples in which Ca atoms were added to hydrogen absorbing alloys scarcely containing $Gd_2Co_7$ phase were found having no improvement effect of the capacity retention ratio; and on the other hand, Examples in which Ca atoms were added to La—Mg—Ni based hydrogen absorbing alloys containing the $Gd_2Co_7$ phase were found having improved capacity retention ratio and particularly, in the case of alloys containing 3% by mass or higher of $Gd_2Co_7$ phase or alloys having the amount of Ca to be added of 0.7% by atom or higher and 9.5% by atom or lower, it was found that the capacity retention ratio was remarkably improved.

In addition, although the capacity retention ratios of Examples 9, 10, and 11 had low values as compared with those of other Examples, the capacity retention ratios were improved as compared with those in the case of the same conditions except that Gd2Co7 phase was less.

Examples 12 to 18 and Comparative Examples 11 and 12

Figure 3:
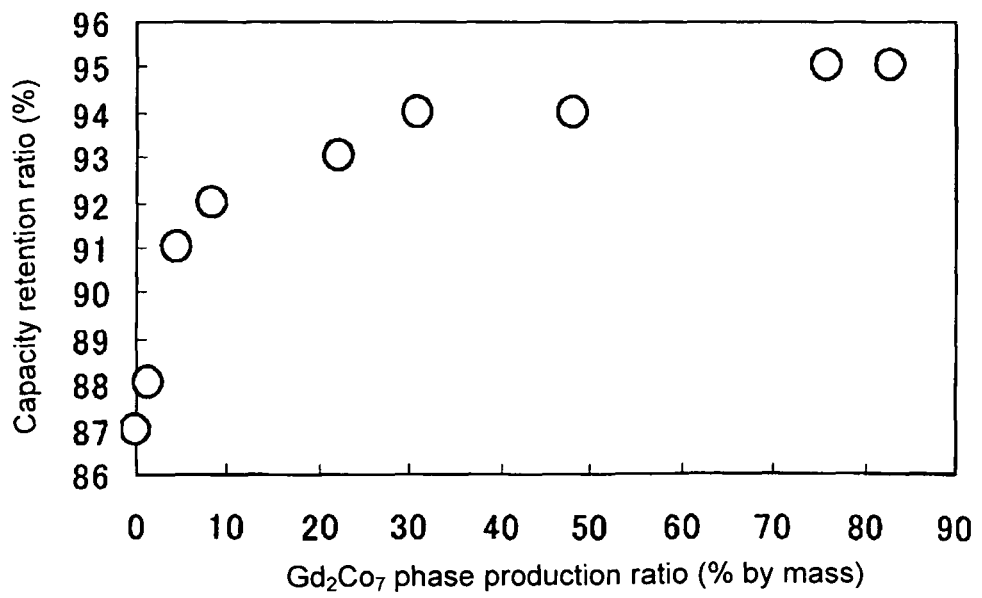
FIG. 3: A graph formed by plotting results of Examples and Comparative Examples, showing the content of $Gd_2Co_7$ phase in the abscissa axis and capacity retention ratio in the ordinate axis.

Nickel-metal hydride batteries of the following Examples and Comparative Examples were produced in the same manner as in Example 1, except that hydrogen absorbing alloys with different contents of mainly $Gd_2Co_7$ phase, as shown in the following Table 3 and Table 4, were used and similarly, the capacity retention ratio was evaluated. The evaluation results of the maximum discharge capacity and capacity retention ratio are shown in Table 4, and based on the data obtained from Table 4, a graph formed by plotting the obtained results is shown in FIG. 3, showing the content of $Gd_2Co_7$ phase in the abscissa axis and capacity retention ratio in the ordinate axis. Example 17 and Comparative Example 12 were the same experimental examples of Example 4 and Comparative Example 10, respectively. FIG. 3 together shows the data of Example 9.

TABLE 3

| | Alloy composition (% by atom) | | | | | | | | | | | |
|---|---|---|---|---|---|---|---|---|---|---|---|---|
| | La | Ce | Pr | Nd | Sm | Y | Ca | Mg | Ni | Co | Mn | Al |
| Example 12 | 13.4 | 0.0 | 0.0 | 3.3 | 0.0 | 0.0 | 1.1 | 3.9 | 78.3 | 0.0 | 0.0 | 0.0 |
| Example 13 | 10.2 | 0.0 | 0.0 | 1.1 | 0.0 | 0.0 | 6.5 | 4.4 | 77.8 | 0.0 | 0.0 | 0.0 |
| Example 14 | 11.1 | 0.0 | 0.0 | 0.0 | 2.2 | 0.0 | 4.4 | 4.4 | 73.3 | 1.8 | 0.0 | 2.6 |
| Example 15 | 11.1 | 0.0 | 0.0 | 2.2 | 0.0 | 0.0 | 5.6 | 3.3 | 77.8 | 0.0 | 0.0 | 0.0 |
| Example 16 | 11.1 | 0.0 | 0.0 | 0.0 | 0.0 | 2.2 | 4.4 | 4.4 | 74.4 | 0.0 | 0.0 | 3.3 |
| Example 17(4) | 11.1 | 0.0 | 2.2 | 0.0 | 0.0 | 0.0 | 3.3 | 5.6 | 77.8 | 0.0 | 0.0 | 0.0 |
| Example 18 | 11.1 | 0.0 | 0.0 | 2.2 | 0.0 | 0.0 | 4.4 | 4.4 | 77.8 | 0.0 | 0.0 | 0.0 |

TABLE 3-continued

| | Alloy composition (% by atom) | | | | | | | | | | | |
|---|---|---|---|---|---|---|---|---|---|---|---|---|
| | La | Ce | Pr | Nd | Sm | Y | Ca | Mg | Ni | Co | Mn | Al |
| Comparative Example 11 | 15.5 | 0.0 | 0.0 | 0.0 | 0.0 | 0.0 | 3.6 | 2.1 | 78.7 | 0.0 | 0.0 | 0.0 |
| Comparative Example 12(10) | 5.5 | 0.0 | 0.0 | 0.0 | 0.0 | 0.0 | 12.0 | 7.5 | 75.0 | 0.0 | 0.0 | 0.0 |

TABLE 4

| | Ratio of crystal phases (% by mass) | | | | | Maximum discharge capacity [mAh/g] | Capacity retention ratio [%] |
|---|---|---|---|---|---|---|---|
| | $Gd_2Co_7$ | $PuNi_3$ | $CaCu_5$ | $Ce_2Ni_7$ | $Ce_5Co_{19}$ | | |
| Comparative Example 11 | 0 | 2 | 26 | 71 | 2 | 379 | 87 |
| Comparative Example 12(10) | 0 | 68 | 29 | 3 | 0 | 389 | 81 |
| Example 12 | 5 | 1 | 23 | 69 | 3 | 382 | 91 |
| Example 13 | 8 | 1 | 3 | 0 | 88 | 390 | 92 |
| Example 14 | 22 | 4 | 2 | 0 | 73 | 368 | 93 |
| Example 15 | 31 | 1 | 12 | 2 | 54 | 378 | 94 |
| Example 16 | 48 | 1 | 2 | 0 | 49 | 375 | 94 |
| Example 17(4) | 76 | 2 | 0 | 0 | 22 | 392 | 95 |
| Example 18 | 83 | 0 | 0 | 0 | 17 | 383 | 95 |

As a result of measurement of the crystal structure, the hydrogen absorbing alloys obtained in Examples and Comparative Examples were found all having a layered structure of a plurality of crystal phases layered in the c-axis direction of the crystal structure.

Further, as shown in Table 4 and FIG. 3, it was found that the capacity retention ratio was also increased as the content ratio of $Gd_2Co_7$ phase was increased and specifically, if the $Gd_2Co_7$ phase was contained in 3% by mass or higher in the La—Mg—Ni based hydrogen absorbing alloy, the capacity retention ratio exceeded 90%; if it was contained in 5% by mass or higher, the capacity retention ratio was 91% or higher; if it was contained in 20% by mass or higher, the capacity retention ratio exceeded about 93%; if it was contained in 22% by mass or higher, the capacity retention ratio was further heightened; if it was contained in 70% by mass or higher, the capacity retention ratio exceeded about 95%; and if it was contained in 76% by mass or higher, the capacity retention ratio was most excellent and thus it was found that a significant effect was exhibited.

Examples 19 to 26 and Comparative Examples 13 and 14

Hydrogen absorbing alloy powders were produced in the same manner as in Example 1, except that Mg contents mainly differ as shown in the following Table 5 and the ratios of produced crystal phases were measured. Further, nickel-metal hydride batteries were produced in the same manner as in Example 1 and similarly, the capacity retention ratio was evaluated. The obtained evaluation results are shown in Table 6, and a graph formed by plotting the obtained results is shown in FIG. 4, showing the content of Mg in the abscissa axis and the content ratio of $Gd_2Co_7$ phase in the ordinate axis.

TABLE 5

| | Alloy composition (% by atom) | | | | | | | | | | | |
|---|---|---|---|---|---|---|---|---|---|---|---|---|
| | La | Ce | Pr | Nd | Sm | Y | Ca | Mg | Ni | Co | Mn | Al |
| Comparative Example 13(5) | 4.2 | 1.0 | 0.7 | 0.8 | 0.0 | 0.0 | 10.0 | 0.0 | 71.7 | 5.0 | 3.3 | 3.4 |
| Example 19 | 16.7 | 0.0 | 0.0 | 0.0 | 0.0 | 0.0 | 4.4 | 1.1 | 77.8 | 0.0 | 0.0 | 0.0 |
| Example 20 | 15.6 | 0.0 | 0.0 | 0.0 | 0.0 | 0.0 | 4.4 | 2.2 | 77.8 | 0.0 | 0.0 | 0.0 |
| Example 21(15) | 11.1 | 0.0 | 0.0 | 2.2 | 0.0 | 0.0 | 5.6 | 3.3 | 77.8 | 0.0 | 0.0 | 0.0 |
| Example 22(5) | 11.1 | 2.2 | 0.0 | 0.0 | 0.0 | 0.0 | 4.3 | 3.7 | 78.7 | 0.0 | 0.0 | 0.0 |
| Example 23(18) | 11.1 | 0.0 | 0.0 | 2.2 | 0.0 | 0.0 | 4.4 | 4.4 | 77.8 | 0.0 | 0.0 | 0.0 |
| Example 24 | 17.4 | 0.0 | 0.0 | 0.0 | 0.0 | 0.0 | 1.2 | 4.7 | 76.7 | 0.0 | 0.0 | 0.0 |
| Example 25 | 14.4 | 0.0 | 0.0 | 0.0 | 0.0 | 0.0 | 2.2 | 5.6 | 77.8 | 0.0 | 0.0 | 0.0 |
| Example 26(11) | 7.9 | 0.0 | 0.0 | 0.0 | 0.0 | 0.0 | 8.8 | 5.8 | 77.5 | 0.0 | 0.0 | 0.0 |
| Comparative Example 14(7) | 14.3 | 0.0 | 0.0 | 0.0 | 0.0 | 0.0 | 2.0 | 8.3 | 75.4 | 0.0 | 0.0 | 0.0 |

TABLE 6

| | Ratio of crystal phases (% by mass) | | | | | Maximum discharge capacity [mAh/g] | Capacity retention ratio [%] |
|---|---|---|---|---|---|---|---|
| | $Gd_2Co_7$ | $PuNi_3$ | $CaCu_5$ | $Ce_2Ni_7$ | $Ce_5Co_{19}$ | | |
| Comparative Example 13(5) | 0 | 0 | 100 | 0 | 0 | 355 | 80 |
| Example 19 | 3 | 8 | 15 | 52 | 22 | 315 | 71 |
| Example 20 | 8 | 4 | 9 | 61 | 18 | 331 | 78 |
| Example 21(15) | 31 | 1 | 12 | 2 | 54 | 378 | 94 |
| Example 22(5) | 58 | 2 | 1 | 0 | 40 | 377 | 95 |
| Example 23(18) | 83 | 0 | 0 | 0 | 17 | 383 | 95 |
| Example 24 | 76 | 0 | 2 | 1 | 21 | 385 | 94 |
| Example 25 | 20 | 1 | 6 | 7 | 66 | 390 | 93 |
| Example 26(11) | 2 | 71 | 17 | 1 | 10 | 385 | 82 |
| Comparative Example 14(7) | 0 | 60 | 27 | 0 | 13 | 381 | 84 |

As a result of measurement of the crystal structure, the hydrogen absorbing alloys obtained in Examples and Comparative Examples (except Comparative Example 13) were found all having a layered structure of a plurality of crystal phases layered in the c-axis direction of the crystal structure.

Further, as shown in Table 6 and FIG. 4, it was found that in a case where no Mg was contained or the content of Mg was 5.8% by atom or higher, the production ratio of $Gd_2Co_7$ phase was less than 3% by mass, and thus no hydrogen absorbing alloy to be used for the present invention could be obtained.

In addition, although the capacity retention ratios of Examples 19 and 20 were low values as compared with those of other Examples, the capacity retention ratios were improved as compared with those in a case where the content of Mg was less than 3.3% by atom and the production ratio of $Gd_2Co_7$ phase was less.

Example 27

A hydrogen absorbing alloy powder was produced in the same condition as that of Example 1, except that the melted raw materials were solidified by a gas atomization method and an opened type cell was assembled in the same procedure as that of Example 1. The ratio of crystal phases produced in the hydrogen absorbing alloy of Example 27 was substantially the same as that of Example 1. The maximum discharge capacity and the capacity retention ratio of the opened type cell of Example 27 were also substantially the same as those of Example 1.

The invention claimed is:

1. A nickel-metal hydride battery comprising a negative electrode, the negative electrode including an La—Mg—Ni based hydrogen absorbing alloy,
    wherein said hydrogen absorbing alloy has a crystal phase having $Gd_2Co_7$ type crystal structure and said hydrogen absorbing alloy contains calcium;
    wherein said hydrogen absorbing alloy has a layered structure of a plurality of crystal phases layered in a c-axis direction of the crystal structure;
    wherein the content of the crystal phase having said $Gd_2Co_7$ type crystal structure is 76% by mass or higher;
    wherein the content of the magnesium in said hydrogen absorbing alloy is 3.3% by atom or higher and 5.6% by atom or lower; and
    wherein the content of said calcium in said hydrogen absorbing alloy is 0.7% by atom or higher and 9.5% by atom or lower.

2. A nickel-metal hydride battery comprising a negative electrode, the negative electrode including an R—Mg—Ni based hydrogen absorbing alloy,
    wherein R comprises a rare earth element;
    wherein said hydrogen absorbing alloy has a crystal phase having $Gd_2Co_7$ type crystal structure and said hydrogen absorbing alloy contains calcium;
    wherein said hydrogen absorbing alloy has a layered structure of a plurality of crystal phases layered in a c-axis direction of the crystal structure;
    wherein the content of the crystal phase having said $Gd_2Co_7$ type crystal structure is 76% by mass or higher;
    wherein the content of the magnesium in said hydrogen absorbing alloy is 3.3% by atom or higher and 5.6% by atom or lower;
    wherein the content of said calcium in said hydrogen absorbing alloy is 0.7% by atom or higher and 9.5% by atom or lower; and
    wherein a number of Ni atoms is at least 3 and at most 5 times as much as a sum of the numbers of R atoms, Mg atoms, and Ca atoms.

* * * * *